Jan. 20, 1970  A. MÜLLER ET AL  3,490,511
ANTISKID OR TIRE PROTECTIVE CHAIN

Filed March 3, 1966  3 Sheets-Sheet 1

Inventors:
Anton Müller
Hubert König
by

Jan. 20, 1970  A. MÜLLER ET AL  3,490,511
ANTISKID OR TIRE PROTECTIVE CHAIN
Filed March 3, 1966  3 Sheets-Sheet 2

Inventors:
Anton Müller
Hubert König
by

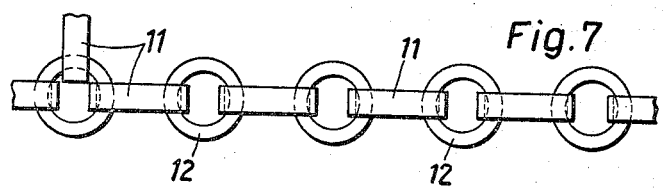
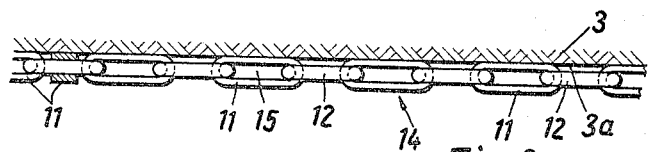
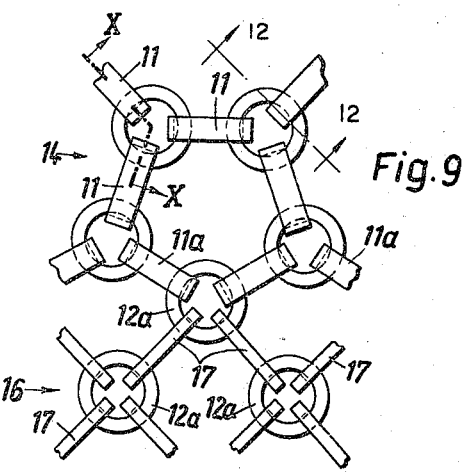
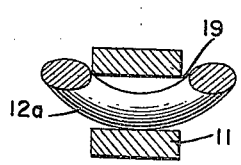
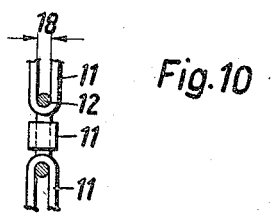

United States Patent Office 3,490,511
Patented Jan. 20, 1970

3,490,511
ANTISKID OR TIRE PROTECTIVE CHAIN
Anton Müller, Unterkochen, Wurttemberg, and Hubert König, Aalen, Wurttemberg, Germany, assignors to Eisen- und Drahtwerk Erlau, AG., Aalen, Wurttemberg, Germany
Filed Mar. 3, 1966, Ser. No. 540,441
Claims priority, application Germany, Sept. 14, 1965,
E 30,090
Int. Cl. B60c 11/00, 27/00
U.S. Cl. 152—243                4 Claims

ABSTRACT OF THE DISCLOSURE

Tire chain in which at least the side sections of the chain are made up of flat links interconnected by endless chain links and with the flat links disposed edgewise to the tire so as to protrude therefrom.

---

The present invention concerns an antiskid or tire protective chain with a running part and two side parts connected to said running part by links.

With heretofore known chains of the type involved for motor vehicle tires, the side parts are so designed that they are suitable merely for connecting the antiskid chain to the motor vehicle wheel. Experience, however, has proved that the mechanical strength of the side chains of heretofore known antiskid or protective chains is insufficient in instances where said side chains get into contact with the road. This is the case in particular with road machinery, such as dredges, or with heavy trucks and the like, which have to drive in narrow ditches. When driving in such narrow ditches, the side parts of the chain rub against the side walls of the ditches which frequently are rocky so that the side parts will break after a rather short time and the vehicle tire will be damaged. In instances where the chains are subjected to particular stress, the side chains built up of round steel links are even sheared off by rocks.

A further drawback of the heretofore known antiskid or tire protective chains is seen in the fact that these chains cannot be employed with certain vehicles in view of a too narrow distance between adjacent vehicle tires and parts of the vehicle inasmuch as these heretofore known chains extend too far in the direction of the axis of the vehicle tire and consequently drag along the vehicle frame or they cannot at all be arranged between the vehicle chassis and the lateral surfaces of the tire. This is the case in particular with heavy soil working vehicles, such as bucketwheel loaders, cross-country trucks, and the like. In view of the dragging and rubbing of the chains on parts of the motor vehicle, the heretofore known antiskid or tire protective chains are prematurely destroyed.

It is, therefore, an object of the present invention to overcome the above-mentioned drawbacks.

It is also an object of the present invention to provide an antiskid or tire protective chain of the above mentioned general type, which will be so designed that the side parts of the chain, even when being subjected to considerable wear, will have a life approximating the life of the running part of the chain.

It is a further object of this invention to provide an antiskid or tire protective chain, which over heretofore known chains of the type involved will have a considerable reduced extension in the axial direction of the tire.

Still another object of this invention consists in the provision of a chain as set forth in the preceding paragraph, which will protect the vehicle tire against damage in the lateral range of the tire.

These and other objects and advantages of the invention will appear more clearly from the following specification in connection with the accompanying drawings, in which.

Figure 3:
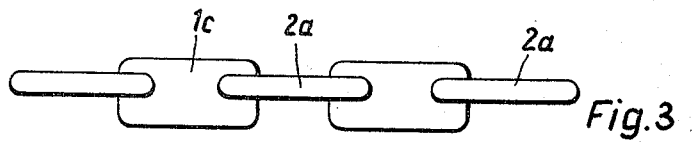
Figure 4:
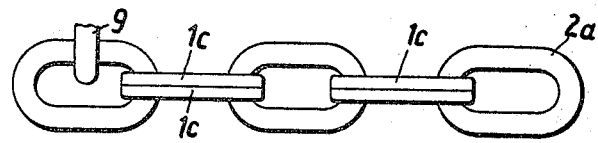

FIGS. 3 and 4 respectively illustrate in top view and side view a portion of a modified chain according to the invention.

Figure 5:
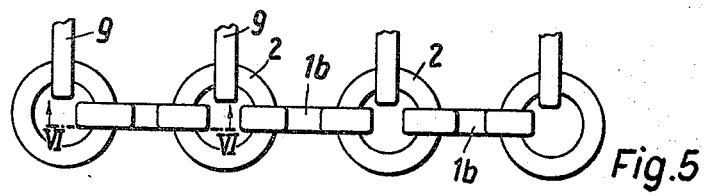

FIG. 5 represents a view of a side chain part with disengageable web links.

Figure 6:
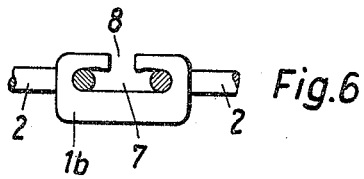
Figure 2A:
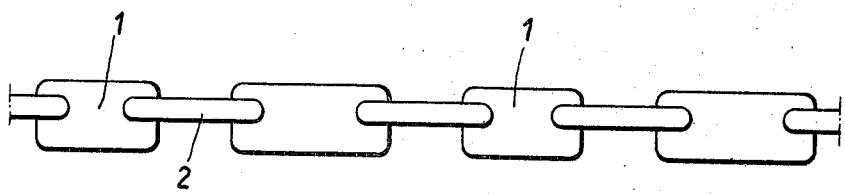
FIG. 2a shows a chain portion slightly modified over that of FIG. 2.

FIG. 6 is a section taken along the line VI—VI of FIG. 5.

FIGS. 7 and 8 illustrate in view and top view a further modification of a chain side part according to the invention.

Figure 8A:
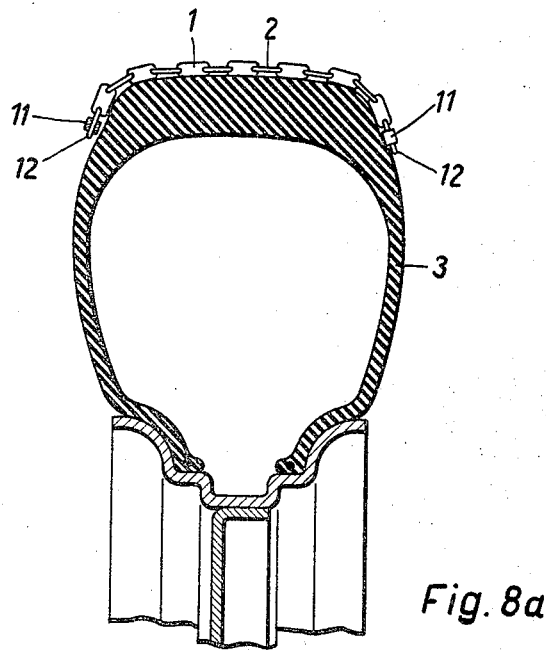

FIG. 8a shows a tire with a chain according to the invention applied thereover.

FIG. 9 illustrates a view of a portion of a chain side part according to the invention connected to a running part.

FIG. 10 represents a section taken along the line X—X of FIG. 9.

Figure 11:
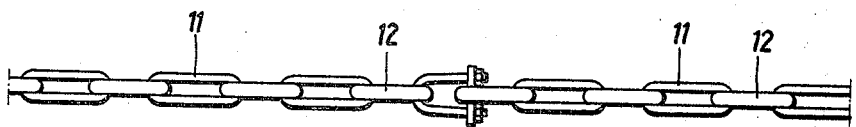

FIG. 11 illustrates means for interconnecting the chain ends.

FIGURE 12 is an enlarged cross section on line 12—12 of FIGURE 9, showing a circular link tilted in an oblong flat link.

An antiskid or tire protective chain according to the present invention which comprises a running part and two side parts connected to the running parts by links is characterized primarily in that that side part which is intended for the outside of the tire is provided with web links which protrude from the tire in a direction approximately perpendicularly to the tire. Such web links consist in most instances of flat material which are located perpendicular to the major surface of the vehicle tire and have a relatively great height in this direction. The web links protrude considerably beyond the other links of the chain so that said other links are protected against ground contact and thereby against wear. Furthermore, these web links cannot be sheared off by pointed objects, as for instance sharp-edged rocks, so that the side chain, even when subjected to considerable stress and after considerable deformation of individual web links, will not break.

According to a further feature of the invention, at least one side part, preferably that chain side part which is to be located on the inside of the tire, has flat links which in stretched out condition of the chain are located in the plane of the annular links interconnecting said flat links. In this way, the antiskid or tire protective chain is suitable also where at one or both sides of the tire a very narrow space prevails between the tire side surface and parts of the motor vehicle. These parts of the motor vehicle may be formed for instance by the chassis on the inner side of the tire or the wheel box or a fender on the outside of the tire.

Inasmuch as the tire side surfaces near the running surface are often only slightly spaced from parts of the motor vehicle, it is possible in the vicinity of the tire tread surface to provide flat links on the chain side parts and to provide web links farther away from the wheel axle. The farther protruding web links will then protect the flat links as well as the annular links interconnecting said flat links against any damage.

According to a further development of the present invention, a plurality of the links which connect the running part of the chain with the side parts thereof are likewise designed as web links. In this way, the side part comprising the web links is followed by outwardly protruding additional web links which afford an additional protection for the chain side part and also for those links of the running part which are located in the lateral range of the tire.

Advantageously, the web links may alternately vary in length whereby the side chains are better adaptable to the unevenness of the ground and thereby will reduce the stress to which they are subjected.

A particularly advantageous design of a chain according to the present invention will be obtained by interconnecting the web links by annular links which are preferably so arranged that alternately two web links are connected to one annular link or two annular links are connected to one web link. The annular links are preferably more or less oval-shaped.

According to a further suggestion of the present invention, the chain side part, detachably connected to the chain running part, may be connected to a new running part replacing a damaged running part. Furthermore, it is advantageous to design the web links as detachable double hooks provided with an oblong recess and with an entrance opening leading into said recess intended for said annular links. In this way, it is possible easily to exchange each individual web link or annular link which might have been damaged or broken.

A reinforcement of the side chain may be effected by arranging the web links in pairs adjacent to each other.

Advantageously, the connecting links are arranged nonsymmetrically in the web links in such a way that the distance between the annular link and that longitudinal edge of the web link which faces the tire is less than the distance between the annular link and that longitudinal edge of the web link which faces outwardly. With such a design, that side of the web link which is subjected to wear, will have a relatively large cross section which in turn will assure a long life of the web link even when the latter is subjected to considerable stress.

In conformity with a further feature of the invention, the flat links are formed preferably into oblong shape. Advantageously, the annular links extend through oblong openings of the flat links and are tiltable relative thereto. The annular links have in said oblong round links a relatively large and wide supporting surface so that a twisting of the individual links relative to each other or to the side links will not be possible. This brings about the advantage that the antiskid or tire protective chain will when in use not change its location relative to the tire and, therefore, will not slip off the tire or be forced therefrom. Consequently, the outer contour of this side chain part may be located further outwardly away from the tire axle, i.e. toward the tire tread surface.

According to a further feature of the present invention, the inside width of the flat link is at least within the range of the annular links passing therethrough only slightly greater than the diameter of said annular links so that the thickness of the side part is considerably less than is the case with heretofore known antiskid or tire protective chains.

According to still another suggestion of the invention, the side part of the chain is held by an annular side chain extending about the tire axis while the side chain is likewise built up from flat links interconnected by annular links. Inasmuch as the antiskid or tire protective chain due to the side parts being equipped with flat links is particularly well held on the tire, the diameter of the side chain may be selected considerably greater whereby the mounting of the antiskid or tire protective chain will be simplified and the weight and space requirement will be reduced.

The side chains are connected to the side parts by means of a hanger attachement which likewise includes flat links. The closure of the side chains is advantageously formed by at least one U-shaped yoke extending in the direction of the side chain, the legs of said yoke being provided with safety plates and nuts. By means of this closure it is possible to tighten or loosen the side chain by tightening or loosening the nuts so that the antiskid or tire protective chain can be adapted precisely to the shape and size of the respective tire.

A further advantageous embodiment of the invention is obtained by designing all of those chain links as flat links which are located within the range of the lateral surface of the tire between the annular links. In this way the entire lateral range of the tire provided with the antiskid or tire protective chain according to the invention will have an axial extension which is considerably reduced over that of heretofore known antiskid or tire protective chains.

The flat links covering the lateral surface of the tire protect the tire against sharp rocks, waste articles, slag, and the like, to a considerably better extent than this is possible with heretofore known antiskid or tire protective chains. In this respect, the connection of the side part to the running part by means of flat links is highly advantageous.

Expediently, the flat links have a width which corresponds approximately to half the free inner diameter of the annular links, while the flat links are approximately twice as thick as the annular links. In this way the flat links have a pull resistance which at least equals the pull resistance of heretofore employed chain links. The length of the flat links corresponds approximately to the outer diameter of the annular links.

According to a particularly advantageous further development of the present invention, the running part has web-shaped running links which are approximately perpendicular to the tire tread surface. These web-shaped running links furnish a good protection for the tire tread surface and also increase the grasp and track maintenance while the flat links or web links on the side parts protect the side walls of the tire and permit the arrangement of the chain also in instances where only a narrow passage is available between the lateral surface of the tire and parts of the motor vehicle.

The flat links may be produced on a bending machine on which the flat links are bent. By means of butt-welding machines or flash butt-welding machines, the flat links are welded together. The web-shaped running links of the running part may be identical to the web links of the side part.

Figure 1:
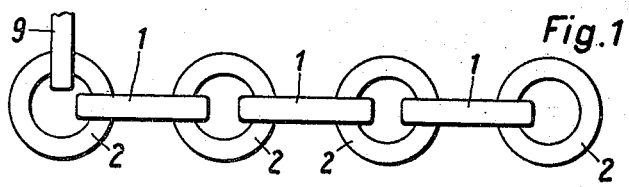
FIG. 1 illustrates in view a portion of the side part of a chain according to the present invention.
Figure 2:
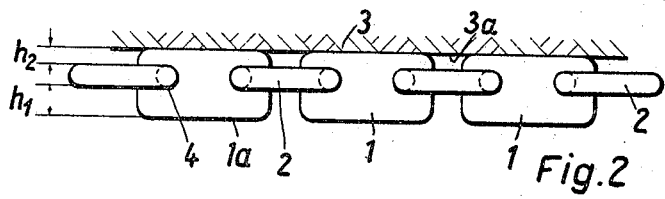
FIG. 2 represents a top view of the chain portion shown in FIG. 1.

Referring now to the drawings in detail, the side chains of an antiskid or tire protective chain according to FIGS. 1 and 2 comprise web links 1 which are interconnected by annular links 2. Advantageously, the web links 1 have their outer walls located at a right angle with regard to each other and have each two recesses engaged by the annular links 2. The web links 1 as shown in FIG. 2 protrude from the lateral tire side wall 3a of a tire 3 in a plane substantially perpendicular to said tire side wall 3a. As will be seen from FIG. 2, the web links 1 protrude from recesses 4 outwardly by a distance $h_1$ which is greater than the distance $h_2$ between recess 4 and tire side wall 3a. The partial height $h_1$ of web link 1 serves as abrasion or wear height by which the web link 1 may be worn until it breaks. Due to the comparatively great distance of the running surface 1a of web link 1 from the annular links 2, the annular links 2 are so protected that they will not contact the ground and consequently will be worn only slightly.

According to the modification shown in FIGS. 3 and 4, the annular links 2 of FIGS. 1 and 2 have been replaced by oblong annular links 2a. Furthermore, as shown in FIGS. 3 and 4, the web links 1c may be arranged in pairs adjacent to each other thereby further reinforcing the side chain.

With the modification shown in FIGS. 5 and 6, the web links 1b form double hooks which are detachably connected to the annular links 2. To this end, the web links 1b have an oblong recess 7 into which a passage 8 leads for introducing the annular links 2. Web links 1b, within the range of the passage 8, engage the vehicle tire. When a portion of the side chain is damaged, such damage can easily be remedied by exchanging individual web links 1b or annular links 2.

The side chains according to FIGS. 1 to 6 which comprise web links and annular links are by means of chain links 9 in conformity with FIG. 5 connected to the running part of the tire protective or antiskid chain. These chain links 9 may be designed as detachable web links corresponding to web links 1b so that the tire protective chain may in conformity with its particular purpose of employment be composed of a corresponding running part and corresponding side chains.

The detachable connection of the side parts to the running part permits a simple repair of the antiskid or tire protective chain. In this connection it is of particular advantage to connect each annular link of the side chain to a web link 9 on the running part in conformity with FIG. 5 inasmuch as in such an instance an additional protection against wear of the annular links of the side chain and of the links of the running part within the range of the lateral tire surfaces will be assured.

When the distance between one or both lateral surfaces of the tire and the adjacent parts of the motor vehicle is relatively narrow, the corresponding side part or side parts are provided with oblong flat links 11, 11a and annular links 12 interconnecting said oblong flat links 11 (FIGS. 7 to 10). The flat links 11 and annular links 12 when in stretched out condition of the side part are located in one plane. When the antiskid or tire protective chain according to the invention is arranged on a tire 3 as shown in FIG. 8, the lateral part 14 flatly engages the tire side wall 3a.

The flat links 11 are formed by flat material bent to an oblong shape, while the annular links 12 extend through the oblong openings 15 of links 11 and are tiltable relative to links 11 about an axis which is parallel to the lateral tire surface 3a.

Lateral part 14 may be of a strand shape, of a net shape, or of any other desired shape. According to the embodiment of FIGS. 9 and 10, side part 14 of the antiskid or tire protective chain according to the present invention is net-shaped. Side part 14 is by means of flat links 11a connected to annular links 12a of the likewise net-shaped running part 16 of the antiskid chain according to the invention. If desired, the flat links 11, 11a of side part 14 may with the running part 16 be replaced by web-shaped running links 17 which have a good grasp and a high wear resistance.

With net-shaped side parts 14, each annular link 12a is passed through three or more flat links 11, 11a whereby the annular links 12a are particularly well supported and protected.

The clear inner width 18 (FIG. 10) of flat links 11 is so selected that the annular links 12 may be tilted in flat links 11 to a desired maximum extent only. As seen in FIGURE 12, when an annular link 12 is tilted in a flat link 11, the edges of the flat link engage the sides of the annular link at 19, so the angular movement of the circular link is limited to an acute angle. The ranges of the side part 14 which merge with the running part 16 are able in view of annular links 12, 12a being tiltable in flat links 11, 11a particularly well to adapt themselves to the lateral arching of the tire. For the same purpose, also the flat links 11, 11a are relatively short, whereas the web links 17 of the running part 16 are longer.

It is, of course, to be understood that the present invention is, by no means, limited to the particular embodiments shown in the drawings but also comprises any modifications within the scope of the appended claims.

What we claim is:

1. An antiskid and tire protective chain having a running section for engaging the tire tread surface and two side sections connected to the side edges of the running section for engaging the tire side wall surfaces, at least one of said side sections comprising circular first links formed of material which is round in cross section and elongated second links formed of flat strip material formed into links which are the same width as the strip material in a direction perpendicular to the plane of the link, said second links being linked to said first links, said first links having their planes substantially parallel to the adjacent region of the respective tire side wall and said second links having their planes substantially perpendicular to the adjacent region of the respective tire side wall when the chain is mounted on a tire, each said second link in at least each end segmental region thereof which is engaged by a said first link having an internal dimension in a direction perpendicular to the plane of the said first link which is only slightly greater than the diameter of the material from which said first link is made for semi-rigidity, the said strip material of said second link being of such width parallel to the plane of said first link that the edges of said strip engage the sides of a circular link when said circular link is pivoted about the second link so that the opposite sides of said second link limit the pivotal movement of the first link to an acute angle substantially less than a right angle.

2. An antiskid and tire protective chain according to claim 1, which includes annular lateral chain means arranged about the tire axis at the radially inner edges of said side sections and further elongated links formed of flat strip material connecting the said annular lateral chain means to said side sections.

3. An antiskid and tire protective chain according to claim 2, in which said annular lateral chain means connected to at least the said one of said side sections comprises links of round material and elongated links of flat material interconnecting said links of round material, said further elongated links being connected to said link of round material.

4. An antiskid and tire protective chain according to claim 2, in which at least one of said annular lateral chain means has separable ends, a U-shaped yoke joining said separable ends, and the ends of the legs of said U-shaped yoke being provided with safety means and nuts.

References Cited

UNITED STATES PATENTS

| | | | |
|---|---|---|---|
| 1,019,830 | 3/1912 | Pejchar | 245—9 |
| 1,242,238 | 10/1917 | Proulx | 152—208 |
| 1,418,836 | 6/1922 | Sharp | 152—239 X |
| 1,512,325 | 10/1924 | Worley | 152—244 |
| 1,834,487 | 12/1931 | German | 152—244 X |
| 1,875,268 | 8/1932 | Senglar | 152—244 X |
| 1,917,161 | 7/1933 | Smith | 152—171 |
| 3,310,092 | 3/1967 | Rieger | 152—171 |
| 3,382,906 | 5/1968 | Muller et al. | 152—243 |

FOREIGN PATENTS

| | | |
|---|---|---|
| 443,511 | 5/1912 | France. |
| 519,779 | 5/1953 | Belgium. |

ARTHUR L. LA POINT, Primary Examiner

U.S. Cl. X.R.

152—231